United States Patent [19]

Jeffs

[11] Patent Number: 5,049,594

[45] Date of Patent: * Sep. 17, 1991

[54] POLYMER COMPOSITIONS CONTAINING INORGANIC FILLERS COATED WITH LATEX AND PROCESS FOR PREPARING COATED FILLERS

[75] Inventor: David G. Jeffs, St. Austell, United Kingdom

[73] Assignee: ECC International Limited, United Kingdom

[*] Notice: The portion of the term of this patent subsequent to Jan. 24, 2006 has been disclaimed.

[21] Appl. No.: 466,639

[22] Filed: Jan. 17, 1990

Related U.S. Application Data

[63] Continuation-in-part of Ser. No. 291,639, Dec. 29, 1988, which is a continuation-in-part of Ser. No. 902,158, Aug. 29, 1986, Pat. No. 4,800,103.

[30] Foreign Application Priority Data

Aug. 30, 1985 [GB] United Kingdom ............... 8521646

[51] Int. Cl.$^5$ .......................... C08K 3/34; C08K 3/26; B32B 19/02
[52] U.S. Cl. .................................. 523/205; 427/221; 428/403; 428/407; 523/206; 523/209; 523/334; 523/342; 524/426; 524/430; 524/445; 524/447; 524/449; 524/451; 524/456
[58] Field of Search ............... 523/205, 206, 209, 218, 523/334, 342; 427/221; 428/403, 407

[56] References Cited

U.S. PATENT DOCUMENTS

| | | | |
|---|---|---|---|
| 3,068,185 | 12/1962 | Stamberger | 428/401 |
| 3,080,256 | 3/1963 | Bundy | 523/209 |
| 4,026,970 | 5/1977 | Backdekf et al. | 525/218 |
| 4,366,285 | 12/1982 | Lukaschek et al. | |
| 4,374,941 | 2/1983 | Sandstrom | |
| 4,375,497 | 3/1983 | Sandstrom | |
| 4,430,436 | 2/1984 | Koyama et al. | 523/206 |
| 4,761,440 | 8/1988 | Laroche | 523/209 |
| 4,800,103 | 1/1989 | Jeffs | 523/209 |

FOREIGN PATENT DOCUMENTS

| | | |
|---|---|---|
| 0202012 | 11/1986 | European Pat. Off. . |
| 1277177 | 10/1961 | France . |
| 2311825 | 12/1976 | France . |
| 625872 | 7/1949 | United Kingdom . |
| 767681 | 2/1957 | United Kingdom . |
| 920466 | 3/1963 | United Kingdom . |
| 936911 | 9/1963 | United Kingdom . |
| 1263496 | 2/1972 | United Kingdom . |
| 1280216 | 7/1972 | United Kingdom . |
| 1392923 | 5/1975 | United Kingdom . |
| 1536443 | 12/1978 | United Kingdom . |
| 1580626 | 12/1980 | United Kingdom . |
| 2126239 | 3/1984 | United Kingdom . |

OTHER PUBLICATIONS

Chemical Abstracts, vol. 83, No. 22, 12/1/75, p. 91, No. 180783c.

Primary Examiner—Herbert J. Lilling
Attorney, Agent, or Firm—Klauber & Jackson

[57] ABSTRACT

There is disclosed a process for preparing an organic polymer composition which includes an inorganic filler, which comprises: (i) treating an inorganic filler by adding to a particulate white inorganic material a natural or synthetic latex composition which comprises a suspension of polymer particles in water wherein the latex solids are selected from the group consisting of acrylic copolymers and vinyl acetate copolymers, and dewatering and drying the resultant mixture, the amount of the natural or synthetic latex composition added being such as to provide from 1% to 10% by weight of latex solids based on the weight of dry inorganic material; and (ii) combining the treated inorganic filler with an organic polymer. Also disclosed is an organic polymeric composition comprising an organic polymer and an inorganic filler.

12 Claims, No Drawings

POLYMER COMPOSITIONS CONTAINING INORGANIC FILLERS COATED WITH LATEX AND PROCESS FOR PREPARING COATED FILLERS

This is a continuation-in-part of copending application Ser. No. 291,639, filed 29th Dec. 1988 which is a continuation-in-part of application Ser. No. 902,158, filed 29th Aug. 1986 and issued as U.S. Pat. No. 4,800,103.

BACKGROUND OF THE INVENTION

This invention relates to an organic polymer composition containing an inorganic filler and to a process for preparing such an organic polymer composition.

Inorganic fillers are commonly incorporated into polymeric resin compositions in order to modify the properties of the resin. For example, the use of a filler generally increases the rigidity and stiffness of a resin. However, most inorganic fillers have a naturally hydrophilic surface which is therefore not easily wetted by polymeric resin compositions which are generally hydrophobic, or oleophilic. This problem is especially acute when the resin is in the form of a low-viscosity liquid because under these conditions it is difficult to dissipate sufficient energy in the composition by mechanical agitation to effect dispersion of the inorganic filler in the polymeric resin. A further disadvantage of conventional inorganic fillers is that they generally have associated with them a small, but significant, quantity of water. Some thermosetting resins, such as nylon produced by polymerising caprolactam, contain as catalysts Grignard reagents which react preferentially with water associated with the filler so that their efficiency in the resin composition is impaired. As little as 100 ppm of water on the filler can completely stop polymerisation. Polyurethane resin compositions generally contain diisocyanates which again react with any water which is present in the composition to evolve carbon dioxide and cause foaming in the composition. Other resin compositions may contain amine catalysts or cobalt salts, both of which are sensitive to any water which may be present and tend to be adsorbed onto the surface of an untreated inorganic filler.

U.S. Pat. No. 3,080,256 describes a process in which an aqueous suspension of clay, for example kaolin clay, is treated first with a polyamine and then with an organic material which may, for example, be an emulsion of a polyester resin. The dewatered and dried product may be used as a filler for organic polymers such as a polyester resin composition. The process disclosed in this patent thus requires a pretreatment step with a polyamine in contrast to the present invention which requires no such pretreatment step with a polyamine.

Our U.S. Pat. No. 4,800,103 (application Ser. No. 902158) claims a process for preparing an inorganic filler which comprises adding to a particulate inorganic material selected from the group consisting of kaolinitic clay, a calcined kaolinitic clay, a calcium carbonate, wollastonite, bauxite, talc or mica, a natural or synthetic latex composition which comprises a suspension of polymer particles in water wherein the latex solids are selected from the group consisting of a natural rubber, a natural rubber which has been substituted with functional groups, a styrene butadiene rubber (SBR) and a poly(vinyl acetate), and dewatering and drying the resultant mixture, the amount of the natural or synthetic latex composition added being such as to provide from 1% to 10% by weight of latex solids based on the weight of dry inorganic material.

SUMMARY OF THE INVENTION

According to a first aspect of the present invention there is provided a process for preparing an organic polymer resin composition which includes an inorganic filler, which comprises: (i) treating an inorganic filler by adding to a particulate white inorganic material a natural or synthetic latex composition which comprises a suspension of polymer particles in water wherein the latex solids are selected from the group consisting of acrylic copolymers and vinyl acetate copolymers, and dewatering and drying the resultant mixture, the amount of the natural or synthetic latex composition added being such as to provide from 1% to 10% by weight of latex solids based on the weight of dry inorganic material; and (ii) combining the treated inorganic filler with an organic polymer resin.

According to a second aspect of the present invention there is provided an organic polymer composition which comprises an organic polymer and a white inorganic filler having a specific surface area of at least $1m^2g^{-1}$ as measured by the BET nitrogen adsorption method, wherein the filler has been treated with a natural or synthetic latex composition comprising a suspension of polymer particles in water wherein the latex solids are selected from the group consisting of acrylic copolymers and copolymers of vinyl acetate, dewatered and then dried, the filler being coated with from 1% to 10% by weight of latex solids, based on the weight of dry inorganic material.

The particulate inorganic material may be chosen from a kaolinitic clay (e.g. kaolin or ball clay), a calcined kaolinitic clay, calcium carbonates, silicates of aluminium and calcium (e.g. the natural calcium silicate known as wollastonite), bauxite, talc, mica, alumina trihydrate, silica, carbonates and hydroxides of magnesium (e.g. natural hydrotalcite), dolomite (i.e. the natural double carbonate of calcium and magnesium), calcium sulphate (e.g. gypsum), and titanium dioxide and mixtures thereof. The inorganic material may be natural or synthetic and, in particular, both natural and synthetic forms of calcium carbonate, silicates of aluminium and calcium, silica, carbonates and hydroxides of magnesium, calcium sulphate and titanium dioxide are within the scope of this invention. Where the material is synthetic it may be precipitated (as with calcium carbonate, silica and titanium dioxide). The inorganic materials specified above are commonly regarded as white inorganic materials; the term "white" used in relation to "inorganic material" does not mean, however, that the mineral necessarily has a pure white colour, but that it is substantially free of any strong non-white hue. Many of the inorganic materials which may be employed in the present invention are cystalline.

Preferably, the particles should be no larger than about 100 microns, more preferably 50 microns and most preferably 20 microns, in diameter.

The specific surface area of the white inorganic material in accordance with the second aspect of this invention should be at least $1m^2g^{-1}$, as measured by the BET nitrogen adsorption method and will preferably be no greater than about $300m^2g^{-1}$. Preferably, the specific surface area will be in the range of from 2 to $10m^2g^{-1}$. By way of example, kaolinitic clay and calcined kaolinitic clay each have a specific surface area of about 5–6m²g⁻¹ whereas that for alumina trihydrate is about 30m²g⁻¹. For certain ultrafine precipitated silicas the value might be as high as 200m²g⁻¹ or more.

The natural or synthetic latex composition is formed from acrylic copolymers (either elastomeric or non-elastomeric although elastomeric is preferred) and non-elastomeric materials such as poly(vinyl acetate) and copolymers of vinyl acetate. The latex composition, which is a stabilised suspension of polymer particles in water, typically contains about 40% to 60% by weight of solids. The latex may be stabilised with the aid of a surfactant or a water-soluble colloid.

The acrylic copolymer may comprise a lower alkyl ($C_{1-4}$) ester of acrylic acid and a lower alkyl ($C_{1-4}$) ester of methacrylic acid. Particularly preferred is a copolymer of ethyl acrylate and methyl methacrylate, for example the copolymer sold by Vinyl Products Limited under the trade name "VINACRYL 4025" (VINACRYL is a Registered Trade Mark). Also suitable are copolymers of lower alkyl acrylic esters and/or lower alkyl methacrylic esters with vinyl acetate, styrene or acrylonitrile.

The copolymers of vinyl acetate may be those formed by copolymerising vinyl acetate with other vinyl monomers, such as styrene and acrylonitrile.

The latex solids employed in the present invention are resistant to temperatures of up to about 150° C. (for acrylic copolymers) and about 135° C. (for vinyl acetate copolymers).

The particulate inorganic material may conveniently be treated with the latex by mixing the latex with an aqueous suspension containing from 5% to 50% by weight of the inorganic material, adding a water-soluble salt having a multivalent cation, and adjusting the pH of the suspension to more than 4.0 in order to coagulate the latex-treated material to form an open three-dimensional network of large floccs. The flocculated material is then dewatered, for example by filtration or by centrifugation, and the resultant cake is thermally dried to a substantially bone-dry state and the dry material pulversied. The quantity of the latex added is such as to provide from 1% to 10% by weight of latex solids, based on the weight of dry inorganic material. The water-soluble salt having a multivalent cation is preferably aluminium sulphate or aluminium chloride, but any other water-soluble salt having a cation of valency at least 2 could be used. The amount of the salt added is generally in the range of from 0.1% to 5.0% by weight, based on the weight of dry inorganic material. Most preferably the pH of the suspension is adjusted to within the range of from 7 to 9. The thermally dried material may conveniently be pulverised by means of an air-swept hammer mill such as, for example, an Atritor mill or a Raymond mill.

An alternative method of producing the latex-treated inorganic material comprises mixing sufficient of the latex to provide from 1% to 10% by weight of latex solids, based on the weight of dry inorganic material, with an aqueous suspension containing from about 40% by weight to about 85% by weight of the inorganic material and a suitable dispersing agent for inorganic material. The resultant mixture is then dried in a spray dryer and, since the product of a spray dryer is generally in the form of hollow microspheres of dry material having a size of, for example, about 0.05 mm, the final pulverising step may be omitted.

Coated inorganic material in accordance with the first aspect of the present invention may be incorporated into organic polymer compositions from which articles may be partially, or wholly, formed. The organic polymer composition into which the filler may be incorporated can be in a solid (i.e. powder) or liquid (i.e. polymeric resin) form. The coated inorganic filler of the present invention is suited to polymeric resin compositions and to organic polymer compositions in powder form.

The dry microspheres prepared in accordance with the invention have also been found to be very suitable for incorporation into organic polymer compositions such as injection moulding thermoplastic compositions and dough moulding thermosetting compositions.

The latex surface-treated filler is found to be readily wettable by organic polymer compositions and disperses more easily in thermoplastic and thermosetting resins than an uncoated filler. For example, the treated filler may be fully dispersed in a given plastomeric resin composition with the expenditure of less mechanical energy in the mixing operation than is necessary with an untreated filler.

The latex surface-treated filler also remains completely dry even after being left in an atmosphere at 80% relative humidity for several days. The treated filler can therefore be used with caprolactam which is polymerised to a resin of the nylon type in the presence of a Grignard reagent as a catalyst. It can also be used in the presence of amine catalysts without reducing their efficiency since it does not adsorb the catalysts, and in the presence of the isocyanate component of a polyurethane resin composition without causing foaming. In thermosetting resins, such as polyesters, acrylics, phenolics, polyurethanes and nylons, the treated filler provides improved impact and tensile strength as compared with the untreated filler. It is believed that the small quantity of latex solids associated with the filler confers a toughening effect on the resin.

It is unexpected and surprising that an inorganic filler which has been surface treated in an aqueous system is hydrophobic to the extent of adsorbingh substantially no water from the atmosphere. One skilled in the art would generally expect advantageous results only from a filler which had been surface treated with a hydrophobic material substantially in the absence of water.

EMBODIMENTS OF THE INVENTION

The invention is illustrated by the following Examples.

EXAMPLE 1

A polyurethane-modified acrylic thermosetting resin was prepared according to the following compositions:

| Ingredient | Parts by weight |
| --- | --- |
| Polyurethane-modified acrylic monomer | 75 |
| Filler | 25 |
| Benzoyl peroxide | 0.9 |
| $N_1N_1$-dimethyl-p-toluidene | 0.19 |

The benzoyl peroxide was added as an initiator and was 50% by weight active. The $N_1N_1$-dimethyl p-toluidene was added as a catalyst.

Polymeric resin compositions having the above composition were prepared containing each of the following inorganic fillers:

a) Paper filler-grade kaolin having a particle size distribution such that 9% by weight consisted of particles having an equivalent spherical diameter larger than 10 microns and 25% by weight consisted of particles having an equivalent spherical diameter smaller than 2 microns.
b) Paper coating grade kaolin having a particle size distribution such that 0.2% by weight consisted of particles having an equivalent spherical diameter larger than 10 microns and 80% by weight consisted of particles having an equivalent spherical diameter smaller than 2 microns.
c) Natural ground chalk having a particle size distribution such that 1% by weight consisted of particles having an equivalent spherical diameter larger than 10 microns and 86% by weight consisted of particles having an equivalent spherical diameter smaller than 2 microns.
d) Micronised talc having a particle size distribution such that 0.1% by weight consisted of particles having an equivalent spherical diameter larger than 10 microns and 80% by weight consisted of particles having an equivalent spherical diameter smaller than 2 microns.

Each inorganic filler a) to d) was divided into two portions. The first portion was incorporated into a batch of the resin composition without further treatment, and the second portion was incorporated into a separate batch of the same resin composition after being surface treated with SBR in the following manner:

The inorganic filler was mixed with water to form an aqueous suspension containing 25% by weight of dry filler. There was then added to this suspension 10% by weight, based on the weight of dry filler, of a SBR latex containing 50% by weight of SBR solids and the mixture was stirred. The suspension was then coagulated by adding 2% by weight, based on the weight of dry filler, of hydrated aluminium sulphate. The pH of the suspension fell to 3.5 but was adjusted to a value within the range from 8 to 8.5 by adding sodium hydroxide solution. Large, open structure floccs were formed which were readily separated from the aqueous medium by filtration. The filter cake was dried at 80° C. for 16 hours and pulverised in a Raymond Mill to form a fine powder.

It was found that, in each case, the surface-treated filler was readily wetted by the resin composition and was rapidly drawn down into the body of the liquid composition, whereas the untreated filler remained floating on the surface of the resin composition for a considerable time and required the expenditure of much mechanical energy to effect complete dispersion of the filler in the composition.

It was also observed that the cure time required to form a hard resin was less when the surface-treated filler was used than when the filler was untreated. For example, the cure time for the resin with no filler present was 5 minutes but this increased to 6½ minutes when 25% by weight of untreated filler of type a) above was added. When, however, the filler was surfacetreated type a) the cure time was reduced to 4 minutes.

The hardened resins containing treated and untreated resins of types a), b), c) and d) were subjected to tests for flexural modulus, flexural yield, tensile strength, and notched and unnotched impact strength and the results obtained are set forth in Table 1. As a comparison a hardened resin prepared according to the formulation shown above except that the filler was omitted was also subjected to the same tests.

TABLE I

| Filler | Treated or untreated | Flexural modulus (MPa) | Flexural yield (MPa) | Tensile strength (MPa) | Impact strength | |
|---|---|---|---|---|---|---|
| | | | | | Notched (KJ · m$^{-2}$) | Unnotched (KJ · m$^{-2}$) |
| None | — | 1326 | 87.1 | 46.3 | 0.93 | 15.79 |
| (a) Filler kaolin | Untreated | 2149 | 49.8 | 23.3 | 0.78 | 3.75 |
| | Treated | 1866 | 56.4 | 30.5 | 0.92 | 4.37 |
| (b) Coating kaolin | Untreated | 2491 | 54.0 | 25.0 | 0.77 | 2.12 |
| | Treted | 2057 | 51.9 | 25.7 | 0.80 | 2.54 |
| (c) Chalk | Untreated | 2084 | 39.6 | 26.6 | 0.74 | 2.20 |
| | Treated | 2028 | 49.5 | 25.3 | 0.75 | 2.47 |
| (d) Talc | Untreated | 2260 | 44.7 | 30.5 | 0.80 | 2.63 |
| | Treated | 2098 | 53.3 | 21.2 | 0.82 | 3.25 |

The tests were performed by the following methods laid down in British Standard Specification 2782: Part III
Flexural modulus and flexural yield—Method 304C
Tensile strength—Method 301C
Notched impact strength—Method 306E
Unnotched impact strength—Method 306D

EXAMPLE 2

A casting polyurethane resin having a 1:1 weight ratio of polyol-containing components to isocyanate-containing components and containing 20% by weight of filler was prepared by mixing the filler with the polyol portion and adding the isocyanate portion to the mixture.

Hardened resins were prepared containing treated and untreated filler of types b), c) and d) as described in Example 1.

A hardened resin of the same type but with no filler was also prepared and the resins were subjected to the same tests as in Example 1.

The results obtained are set forth in Table II below:

TABLE II

| Filler | Treated or untreated | Flexural modulus (MPa) | Flexural yield (MPa) | Tensile strength (MPa) | Impact strength | |
|---|---|---|---|---|---|---|
| | | | | | Notched (KJ · m$^{-2}$) | Unnotched (KJ · m$^{-2}$) |
| (a) None | — | 1049 | 50.8 | 35.8 | 1.64 | 10.87 |
| (b) Coating kaolin | Untreated | 1080 | 34.5 | 19.2 | 1.07 | 2.90 |
| | Treated | 1117 | 35.5 | 19.0 | 1.00 | 3.99 |
| (c) Chalk | Untreated | 1239 | 33.1 | 18.8 | 0.90 | 3.00 |

TABLE II-continued

| Filler | Treated or untreated | Flexural modulus (MPa) | Flexural yield (MPa) | Tensile strength (MPa) | Impact strength Notched (KJ·m$^{-2}$) | Impact strength Unnotched (KJ·m$^{-2}$) |
| --- | --- | --- | --- | --- | --- | --- |
| (d) Talc | Treated | 1050 | 35.4 | 18.9 | 0.98 | 4.73 |
|  | Untreated | 1122 | 29.6 | 16.0 | 0.77 | 3.50 |
|  | Treated | 1077 | 29.7 | 18.3 | 1.09 | 4.62 |

EXAMPLE 3

Batches of unsaturated polyester resin were prepared from a solution comprising 45% by weight of styrene and 55% by weight of a mixture of polyester monomers consisting essentially of about 50% by of propylene glycol, about 25% by weight of maleic anhydride and about 25% by weight of phthalic anhydride. Each batch was prepared by mixing together by means of a laboratory stirrer the solution of polyester monomers in styrene, 1% by weight based on the weight of polyester resin of cobalt octoate accelerator, and in the batches incorporating an inorganic filler 25% by weight of filler based on the weight of polyester resin. There was then added with continued stirring 2% by weight, based on the weight of polyester resin, of methyl ethyl ketone peroxide initiator.

Samples of each batch were injected into a mould designed to form square panels of dimensions 300 mm × 300 mm × 3 mm and were cured at 25° C. for a gel time which varied from batch to batch plus an additional 30 minutes to allow the resin to harden. Each panel was then further cured for 3 hours in an oven at 80° C. before testing.

Five batches A to E were prepared in this way as follows:

Batch A: No inorganic filler

Batch B: The filler was a kaolinitic clay having a particle size distribution such that substantially all of the particles had an equivalent spherical diameter between 10 and 2 microns.

Batch C: The filler was the same kaolinitic clay as was used in Batch B but treated in accordance with the invention by mixing with an aqueous suspension containing 50% by weight of the clay and 0.1% by weight, based on the weight of dry clay, of a sodium polyacrylate dispersing agent, sufficient of the SBR latex used in Example 1 to provide 5% by weight of polymer solids on the dry clay. The resultant mixture was then spray dried in a spray drier to form hollow microspheres which were then pulverised to give a product substantially all of which was smaller than 20 microns diameter.

Batch D: The filler was a ground natural chalk having a particle size distribution such that 60% by weight of the particles had an equivalent spherical diameter smaller than 2 microns.

Batch E: The filler was the same ground chalk as was used in Batch D but treated in accordance with the invention by mixing with an aqueous suspension containing 60% by weight of the chalk and 0.1% by weight, based on the weight of dry chalk, of sodium polyacrylate dispersing agent sufficient of the SBR latex used in Example 1 to provide 5% by weight of polymer solids of the dry chalk. The mixture was then spray dried and pulverised as described for Batch C.

The gel time for each batch was recorded and the injection moulded panels were tested for surface gloss by measuring the percentage of incident light which was reflected or scattered back at two different angles to the perpendicular to the plane of the panel.

The colour of the panels was also measured by a system which is based on the formula known as the C.I.E. 1976 L* a* b* formula which was developed by the Commission Internationale d'Eclairage. Three measurements of the intensity of light reflected from the surface of the panel were made using Tristimulus X, Y and Z filters. (These are filters which each embrace a broad band of wavelengths in the visible spectrum but are generally red, green and blue in colour respectively). The measurements are made by means of an Elrepho reflectometer and L*, a* and b* values are calculated from the reflectance values for the X, Y and Z filters according to the formula:

$$L^* = 10\sqrt{Y}, \quad a^* = \frac{17.5(1.02X - Y)}{\sqrt{Y}},$$

$$b^* = \frac{7.0(Y - 0.8467Z)}{\sqrt{Y}}$$

The a* and b* value can be said to be co-ordinates representing chromaticity (i.e. "redness", "yellowness" etc.) and the L* value can be said to represent the lightness or darkness of the shade. Of special interest is the difference in colour of the sample of the filled polymer composition from pure white (L* = 100, a* = b* = 0), and for this purpose there is calculated a colour difference ΔE which is given by:

$$\Delta E = [(\Delta L^*)^2 + (\Delta a^*)^2 + (\Delta b^*)^2]^{\frac{1}{2}}$$

where ΔL*, Δa* and Δb* represent the difference in the L*, a* and b* values of the sample from those of a pure white surface.

The results obtained are set forth in Table III below:

TABLE III

|  | Gel time (min) | Gloss (%) at 20° | Gloss (%) at 60° | L* | a* | b* | ΔE |
| --- | --- | --- | --- | --- | --- | --- | --- |
| Batch A[1] | 15 | 34.5 | 80.0 | — | — | — | — |
| Batch B[1] | 32 | 7.2 | 42.9 | 36.0 | +1.2 | +9.2 | 64.7 |
| Batch C[2] | 6 | 23.5 | 63.5 | 65.3 | −0.1 | +14.8 | 37.7 |
| Batch D[1] | 15½ | 3.9 | 32.6 | 69.8 | +1.4 | +16.0 | 34.2 |
| Batch E[2] | 15½ | 24.6 | 64.3 | 81.5 | +0.7 | −11.6 | 21.9 |

[1] = comparative
[2] = invention

These results show that the use in a polyester composition of an inorganic filler treated in accordance with the invention give a shorter gel time and improved gloss and whiteness as compared with the untreated inorganic filler.

EXAMPLE 4

Nylon compositions were prepared by mixing together pellets of the nylon 66, Zytel E101, manufactured by the Du Pont company with 30% by weight, based on the weight of nylon, of an inorganic filler. The mixture was then compounded using a twin screw compounding extruder having screws of diameter 30 mm and samples for testing for flexural modulus, flexural yield strength, tensile yield strength and falling weight impact strength were prepared by injection into a tree mould at 300° C. The moulded samples were conditioned in boiling water for 1 hour and equilibrated at 20° C. and 50% RH until a constant weight of about 2.5% by weight of water based on the weight of dry nylon had been absorbed. The equilibration normally required from 7 to 10 days.

Two batches A and B were prepared as follows:

Batch A: This incorporated a conventional filler for nylon 66 which was a calcined kaolinitic clay having a particle size distribution such that 55% by weight of the particles had an equivalent spherical diameter smaller than 2 microns.

Batch B: The inorganic filler was the kaolinitic clay treated in accordance with the invention which was described in Example 3, Batch C.

The samples were tested for flexural modulus, flexural and tensile yield strength as indicated in Example 1 and for falling weight impact strength. The results obtained are set forth in Table IV below. The falling weight impact test was performed by means of a Yarsley falling weight impact tester in which a 5 Kg weight having a 20 mm hemispherical tup was allowed to fall through a height of 820 mm on to a nylon disc of diameter 100 mm and thickness 3 mm supported on a ring of internal diameter 40 mm. A transducer monitored the vertical deflection of the centre of the nylon disc with time after contact with the falling weight and the maximum deflection was recorded and the energy absorbed before rupture occurred was calculated.

TABLE IV

| | Flexural modulus (MPa) | Flexural yield (MPa) | Tensile strength (MPa) | Falling weight impact strength Deflection (mm) | Falling weight impact strength Energy (J) |
| --- | --- | --- | --- | --- | --- |
| Batch A[1] | 953 | 59.2 | 36.4 | 16.7 | 23.2 |
| Batch B[2] | 1133 | 68.1 | 39.7 | 24.9 | >40 |

[1] = comparative
[2] = invention

The disc formed from nylon from Batch B did not rupture in the falling weight impact test.

EXAMPLE 5

Polypropylene compositions were prepared by compounding together using a twin roll mill, steam heated at about 130° C., a polypropylene powder premix marketed by Imperial Chemical Industries PLC under the trade name PROPATHENE GW522M and various quantities of inorganic filler.

Samples required for the tensile strength test described under Method 301C of British Standard Specification 2782: Part III were prepared for injection moulding and were equilibrated at 20° C. and 50% RH for 7 days.

The two inorganic fillers used were:

A: The untreated kaolinitic clay described in Example 3, Batch B

B: The treated kaolinitic clay described in Example 3, Batch C

The results of the tensile tests performed on the different polypropylene compositions are set forth in Table V below:

TABLE V

| % by weight of filler based on weight of polypropylene | Tensile strength (MPa) Filler A untreated | Tensile strength (MPa) Filler B treated |
| --- | --- | --- |
| 20 | 40.2 | 41.1 |
| 30 | 40.2 | 41.5 |
| 40 | 38.2 | 41.0 |
| 50 | 36.1 | 40.2 |

EXAMPLE 6

Polypropylene compositions were prepared by compounding together using a twin roll mill, steam heated to 165° C. a polypropylene powder premix marketed by Imperial Chemical Industries PLC under the trade name "PROPATHENE GW522M" ("PROPATHENE" is a Registered Trade Mark) and 30% by weight, based on the weight of polypropylene, of fillers A, B or C as described below:

Filler A was a paper filler grade kaolinitic clay having a particle size distribution such that 5% by weight consisted of particles having an equivalent spherical diameter larger than 10 microns and 15% by weight consisted of particles having an equivalent spherical diameter smaller than 2 microns.

Filler B was the same kaolinitic clay as in filler A but treated by mixing with an aqueous suspensions containing 40% by weight of the clay and 0.1% by weight, based on the weight of dry clay, of a sodium polyacrylate dispersing agent, sufficient of a styrene butadiene rubber (SBR) latex containing 50% by weight of SBR solids to provide 5% by weight of polymer solids based on the weight of the dry clay. The resultant mixture was then spray dried in a spray drier to form hollow microspheres which were then pulverised to give a product substantially all of which was smaller than 20 microns.

Filler C was prepared using the same kaolinitic clay and in the same manner as described for filler B except that the SBR latex was replaced in accordance with the invention, by a latex which is marketed under the trade name "VINACRYL 4025" and which contains solid particles consisting of a copolymer of ethyl acrylate and methyl methacrylate. Each polypropylene composition after compounding was disintegrated to form small pellets of size about 2-3 mm by means of a shredder provided with rotating knife blades and test pieces were formed by injection moulding for the tensile strength test described under Method 301C of British Standard Specification 2782: Part III and for the flexural modules test described under Method 304C of the same British Standard Specification. Each test piece was equilibrated at 21° C. in a temperature controlled room for 5 days. The tensile strength and flexural modules were then measured for each polypropylene composition to determine the initial values of the two properties. The test pieces were then laid on perforated stainless steel racks so that they were not in contact with each other and placed in an oven which was maintained at a temperature of 120° C. and provided with a forced draught. The throughput of fresh air through the oven was set to the highest level available to ensure that any volatilised material evolved from the test pieces was removed before cross contamination could occur.

Test pieces for the tensile strength test and for the flexural modules test were removed from the oven at intervals of 24 hours, up to 192 hours, and were equilibrated at 21° C. for 5 days. The tensile strength and flexural modules of the test pieces were then measured by the appropriate British Standard tests.

For each polypropylene composition the time taken respectively, for the tensile strength and the flexural modules to fall to 80%, 70%, 60% and 50% of its initial value was calculated and the results are set forth in Table VI below:

TABLE VI

|  | x% of initial value | A | | B | | C | |
|---|---|---|---|---|---|---|---|
|  |  | Flexural modulus (mPa) | Tensile strength (mPa) | Flexural modulus (mPa) | Tensile strength (mPa) | Flexural modulus (mPa) | Tensile strength (mPa) |
| Time (hr) to | 80 | 47 | 16 | 172 | 122 | * | * |
| fall to x% | 70 | 62 | 25 | 183 | 152 | * | * |
| of initial | 60 | 82 | 32 | 197 | 168 | * | * |
| value | 50 | 103 | 39 | 212 | 174 | * | * |
| initial value |  | 3590 | 40.0 | 3230 | 42.0 | 3420 | 37.8 |

* The value did not decrease with time in the period of the experiment (192 hours) but rather increased.

It is believed that the flexural and tensile properties of the polypropylene composition containing filler A, the untreated kaolinitic clay, deteriorated relatively rapidly at a temperature of 120° C. because the kaolinitic clay catalyses the oxidative degradation of the polypropylene. In the case of the polypropylene composition containing filler C, the kaolinitic clay treated with a coherent and heat stable coating cover the surface of the clay, thus substantially preventing catalytic activity. The thermal degradation of the polypropylene composition containing filler B, the kaolinitic clay treated with an SBR latex, was intermediate between those for the other two compositions, possibly because the SBR latex itself degrades at 120° C.

I claim:

1. A process for preparing an organic polymer composition which includes an inorganic filler, which comprises: (i) treating an inorganic filler by adding to a particulate white inorganic material a natural or synthetic latex composition which comprises a suspension of polymer particles in water wherein the latex solids are selected from the group consisting of acrylic copolymers and vinyl acetate copolymers, and dewatering and drying the resultant mixture, the amount of the natural or synthetic latex composition added being such as to provide from 1% to 10% by weight of latex solids based on the weight of dry inorganic material; and (ii) combining the treated inorganic filler with an organic polymer.

2. A process according to claim 1, wherein the particulate white inorganic material is selected from the group consisting of kaolinitic clay, a calcined kaolinitic clay, a calcium carbonate, silicates of calcium and aluminium, bauxite, talc, mica, alumina trihydrate, silica, carbonates and hydroxides of magnesium, dolomite, calcium sulphate and titanium dioxide, and mixtures thereof.

3. A process according to claim 1, wherein substantially all the particles in the inorganic material are not larger than 0.100 mm.

4. A process according to claim 1, wherein the acrylic copolymer is elastomeric.

5. A process according to claim 1, wherein the acrylic copolymer is non-elastomeric.

6. A process according to claim 4 or 5, wherein the acrylic copolymer is a copolymer of a lower alkyl ester of acrylic acid and a lower alkyl ester of methacrylic acid.

7. A process according to claim 1, wherein the acrylic copolymer is a copolymer of one or both of a lower alkyl ester of acrylic acid and a lower alkyl ester of methacrylic acid with a further monomer selected from the group consisting of styrene, acrylonitrile and mixtures thereof.

8. A process according to claim 1, wherein the latex solids is a copolymer of vinyl acetate and wherein the copolymerising monomer is selected from the group consisting of a lower alkyl ester of acrylic acid, a lower alkyl ester of methacrylic acid, styrene, acrylonitrile and mixtures thereof.

9. A process according to claim 1, wherein an aqueous suspension containing from 5% to 50% by weight of the inorganic material is mixed with a natural or synthetic latex composition containing from about 40% to about 60% by weight of solids, a water-soluble salt having a multi-valent cation is added to the resulting mixture, the pH of the resulting mixture is adjusted to a value greater than 4.0 to form flocs, the mixture containing the flocculated material is dewatered, and the dewatered solids are dried to a substantially bone-dry state.

10. A process according to claim 1, wherein the resultant mixture of inorganic filler and latex is dewatered and dried by spray drying to form hollow microspheres.

11. An organic polymer composition which comprises an organic polymer and a white inorganic filler having a specific surface area of at least 1 $m^2 g^{-1}$ as measured by the BET nitrogen adsorption method, wherein the filler has been treated with a natural or synthetic latex composition comprising a suspension of polymer particles in water wherein the latex solids are selected from the group consisting of acrylic copolymers and copolymers of vinyl acetate, dewatered and then dried, the filler being coated with from 1% to 10% by weight of latex solids, based on the weight of dry inorganic material.

12. An organic polymer composition as claimed in claim 11, wherein the organic polymer is a thermosetting resin.

* * * * *